United States Patent
Slavic et al.

(10) Patent No.: US 11,749,041 B2
(45) Date of Patent: *Sep. 5, 2023

(54) MOBILE APPLICATION FOR VISITING GYMS

(71) Applicants: Elliot Slavic, Deland, FL (US); Schaeffer Slavic, Deland, FL (US)

(72) Inventors: Elliot Slavic, Deland, FL (US); Schaeffer Slavic, Deland, FL (US)

(73) Assignee: GOGYM APP, INC., Deland, FL (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/582,975

(22) Filed: Jan. 24, 2022

(65) Prior Publication Data
US 2022/0172540 A1 Jun. 2, 2022

Related U.S. Application Data

(63) Continuation of application No. 16/838,767, filed on Apr. 2, 2020, now Pat. No. 11,232,662.
(Continued)

(51) Int. Cl.
| | |
|---|---|
| *G06Q 30/00* | (2023.01) |
| *G07C 9/00* | (2020.01) |
| *G07C 9/29* | (2020.01) |
| *G07C 9/28* | (2020.01) |
| *G06Q 30/0251* | (2023.01) |

(52) U.S. Cl.
CPC ..... *G07C 9/00896* (2013.01); *G06Q 30/0251* (2013.01); *G06Q 30/0261* (2013.01);
(Continued)

(58) Field of Classification Search
None
See application file for complete search history.

(56) References Cited

U.S. PATENT DOCUMENTS 8,083,643 B2 * 12/2011 Ng .................... G16H 20/30
705/14.1
9,438,597 B1 * 9/2016 Taylor ................ H04L 63/0853
(Continued)

FOREIGN PATENT DOCUMENTS

WO WO-2020206210 A1 * 10/2020 ......... G06Q 30/0601

*Primary Examiner* — Luis A Brown
(74) *Attorney, Agent, or Firm* — Malloy & Malloy, P.L.; Robert M. Downey

(57) ABSTRACT

A system and method for locating fitness centers within a user's geographic area and gaining access and redeeming time-based memberships to fitness centers through an integrated mobile computer application via a mobile electronic device (e.g., smartphone, electronic tablet). The integrated mobile computer application allows an individual user to purchase a time-based membership (e.g., one day, two day, three day, one week, one month, etc.) from participating fitness centers using the integrated mobile computer application, redeem and activate the time-based membership upon check-in at a selected fitness center, and then continue to subsequently check-in at the selected fitness center throughout the term of the purchased time-based membership. In a preferred embodiment, initial check-in, activation and subsequent check-in at the selected fitness center is achieved through an electronic validation process using the user's mobile electronic device.

7 Claims, 6 Drawing Sheets

Related U.S. Application Data

(60) Provisional application No. 62/899,534, filed on Sep. 12, 2019, provisional application No. 62/830,053, filed on Apr. 5, 2019.

(52) U.S. Cl.
CPC ........... *G07C 9/00817* (2013.01); *G07C 9/28* (2020.01); *G07C 9/29* (2020.01); *G07C 2009/00841* (2013.01)

(56) References Cited

U.S. PATENT DOCUMENTS

| | | | |
|---|---|---|---|
| 10,628,822 B1* | 4/2020 | Belleville | G06Q 20/3672 |
| 2003/0078789 A1* | 4/2003 | Oren | G06Q 30/02 |
| | | | 705/1.1 |
| 2005/0107035 A1* | 5/2005 | Zoeckler | H04H 20/72 |
| | | | 455/12.1 |
| 2009/0272798 A1* | 11/2009 | Dedis | G06Q 30/02 |
| | | | 235/380 |
| 2011/0098156 A1* | 4/2011 | Ng | G16H 20/30 |
| | | | 705/14.1 |
| 2015/0363756 A1* | 12/2015 | Zieger | G07C 9/20 |
| | | | 705/39 |
| 2017/0076523 A1* | 3/2017 | Rumble | G07C 9/27 |
| 2017/0364970 A1* | 12/2017 | Allen | G06Q 30/0284 |
| 2020/0184464 A1* | 6/2020 | Zagone | G06Q 20/3672 |
| 2020/0320811 A1* | 10/2020 | Slavic | G07B 15/00 |

* cited by examiner

MOBILE APPLICATION FOR VISITING GYMS

This non-provisional patent application is a Continuation application of non-provisional patent application Ser. No. 16/838,767, filed on Apr. 2, 2020 which was based on prior filed provisional patent application Ser. No. 62/830,053 filed on Apr. 5, 2019 and provisional patent application Ser. No. 62/899,534 filed on Sep. 12, 2019.

BACKGROUND OF THE INVENTION

Field of the Invention

The present invention relates generally to systems and methods for providing memberships to fitness centers and, more particularly, to a system and method for finding fitness centers within a user's geographical location and gaining access and redeeming memberships to fitness centers through an integrated mobile application using a mobile electronic device, such as a smartphone or electronic tablet.

Discussion of the Related Art

The process of joining a gym or fitness center, and obtaining a membership, generally involves visiting the gym/fitness center and being confronted with a high-pressure sales pitch. Most gyms and fitness centers are looking to sign up prospective members under a contract that commits the member to pay a monthly membership fee regardless of the number of visits to the gym/fitness center. Many people end up signing contracts for memberships and after a few visits to the gym, they either stop going all together or only visit the gym/fitness center a few days a month. Cancelling the membership can often be difficult and generally requires the member to forfeit a security fee and one month's membership fee.

For those individuals who do frequently use a gym/fitness center, they may find themselves in a situation where they are away from home and unable to do their normal workout. While some national chain gyms and fitness centers have locations throughout most major cities in the United States, and members are typically allowed to visit these gyms/fitness centers under the same national chain, they may find that their particular gym/fitness center chain is not near their location when traveling to another town or city. Also, there may be certain facilities that the person is looking for and they are not available at the out of town location. Many people belong to more specialized gyms and fitness centers that only have a few locations and, thus, while away from home, they are unable to do their normal workout. And, while some hotels do have small fitness centers within their facility, these fitness centers or fitness rooms do not offer a great deal of options to the user. Often, the equipment in these hotel facilities is very limited and may not be suited for many individuals that have specific fitness routines and goals.

Accordingly, there remains a need for a system and method that allows individuals to search for gym/fitness center facilities within their geographical area, such as when traveling, and wherein the system and method allow the person to select and purchase time-based memberships at any one or more gyms/fitness centers within the area, and further wherein the person can then visit the selected gym/fitness center and use the facilities during the time-based membership. There is a further need for a mobile application based system and method that allows users to identify gyms/fitness centers within a predefined geographical area and to allow the individual users to select and purchase time-based memberships (e.g., one day, two day, three day, one month, six months, etc.) at the selected one or more gym/fitness centers and to then activate the purchased time-based membership(s) by visiting the selected gym/fitness centers using the mobile application residing on a mobile electronic device (e.g., smartphone, tablet, etc.).

SUMMARY OF THE INVENTION

The present invention is directed to a system and method for searching for and finding fitness centers within a user's geographical location and gaining access and redeeming memberships to fitness centers through an integrated mobile application using a mobile electronic device, such as a smartphone or electronic tablet. The integrated mobile application allows an individual customer to purchase a time-based membership (e.g., one day, two days, three days, one month, etc.) through the mobile application. The system further allows the user to redeem the membership upon checking-in to the fitness center where the membership has been purchased, through the mobile application, and then continue checking-in to the fitness center throughout the remainder of the membership period through the mobile application.

According to the system and method of the present invention, individual customers (app users) purchase individual "one gym" membership passes through the mobile application. Individual passes are sold to individual people from participating gyms/fitness centers. The membership passes are not scheduled by the fitness centers. The membership passes are activated at any time by the app user when the app user first checks into the fitness center. The membership passes are time-based and may include, for instance, a one day pass, a two day pass, a three day pass, a one week pass, a one month pass, a three month pass, a six month pass or a full one year pass. The membership passes are sold individually, however app users can purchase more than one pass to a fitness center, even if they have already purchased a membership pass at the same fitness center or a different fitness center. The membership pass is not activated until the app user checks-in at the respective fitness center for the first time. Once the app user has checked-in to the fitness center for the first time with their respective membership pass, that membership pass will activate and count down to expiration. The membership pass does not expire until the time runs out. All membership passes purchased by the app user will appear in a designated section within the mobile application. The user is able to see a list of fitness centers/gyms to which the app user has membership passes that are still valid (either not yet activated or activated and not yet expired). Check-in at the fitness center is accomplished as a digital communication (e.g., near field communication (NFC) or optical scanning/reading, such as a QR code) using the app user's smart device (e.g., smartphone or electronic tablet), and not through the fitness center's software (unless manual check-in is opted).

The app user will have the option to request a tour of the fitness center when they purchase the membership pass to that particular fitness center using the mobile application. Upon completion of the purchase, the mobile application will show the user a check box labeled "Request a Tour?" and if the check box is checked, the gym will be notified that the app user has requested a tour when the app user first checks-in to the fitness center and activates their membership pass.

If the app user enters a participating fitness center, but has not yet purchased a membership pass to that particular fitness center/gym, they can purchase a membership pass at the time of first check-in. This can be accomplished either through the mobile application (e.g., by electronic communication, such as near field communication or by electronic reading/scanning, such as scanning a QR code presented on the display of the app user's smartphone) or manually through the fitness center's software. Ideally, the app user will have an NFC enabled device, such as a smartphone or an NFC enabled card. The user then scans their NFC enabled device over an NFC tag/decal at the fitness center check-in counter. The mobile application will then navigate directly to that particular fitness center's profile on the app user's smartphone. The app user can then select to purchase the desired time-based membership and proceed through check-in at the fitness center, thereby immediately activating the purchased membership pass for that particular fitness center.

BRIEF DESCRIPTION OF THE DRAWINGS

For a fuller understanding of the nature of the present invention, reference should be made to the following detailed description taken in conjunction with the accompanying drawings in which.

DETAILED DESCRIPTION OF THE PREFERRED EMBODIMENTS

Figure 1:
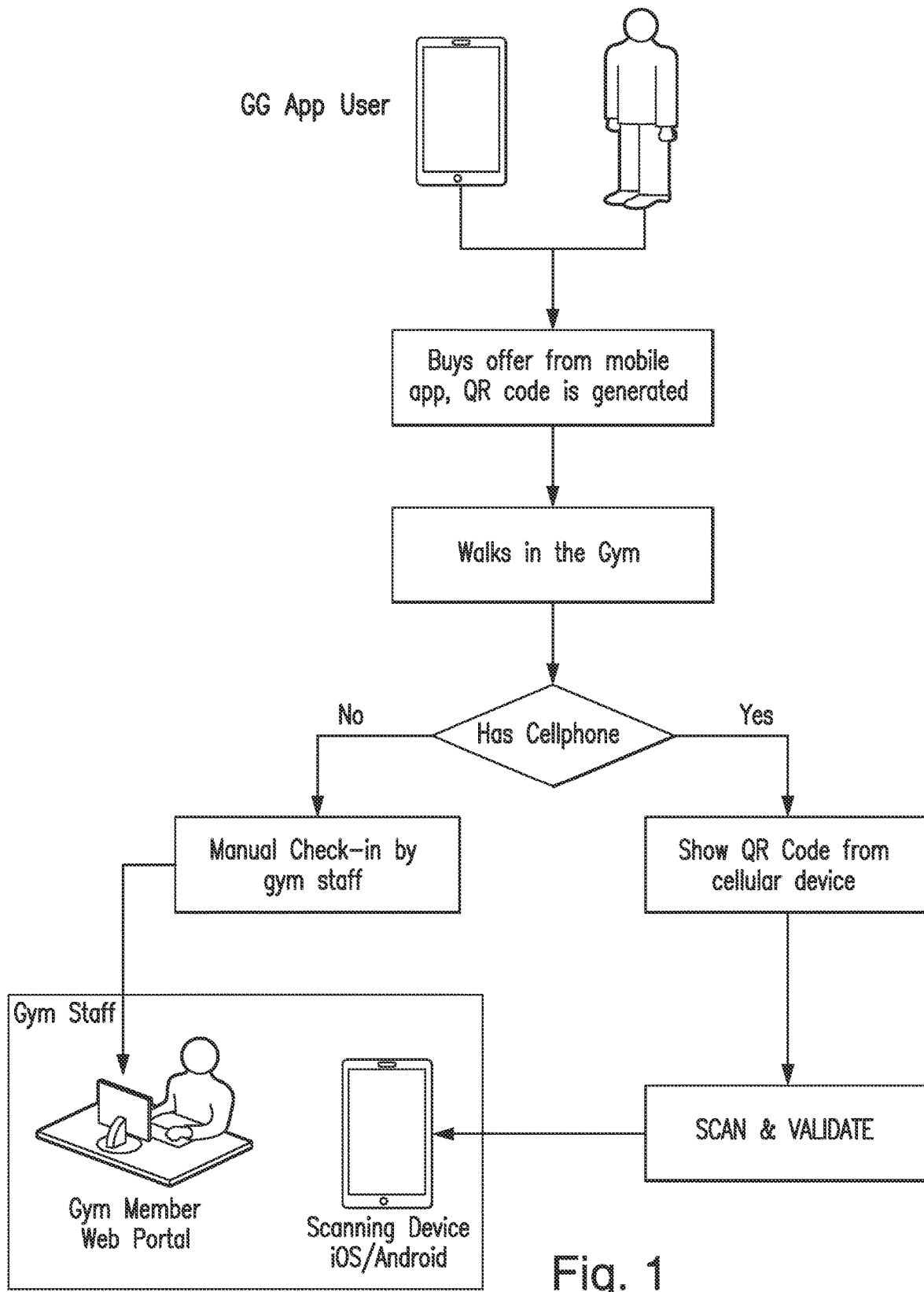
FIG. 1 is a schematic diagram illustrating a device-to-device scanning check-in and validation process in accordance with one embodiment of the present invention.

A system and method provides a mobile application that is downloaded onto a user's smart electronic device (e.g., smartphone or other portable smart electronic device). The mobile application allows users to visit nearby gyms/fitness centers and to undergo a check-in and validation process using the user's smart electronic device or, alternatively, an NFC enabled chip on a card in order to use the facilities at a selected gym/fitness center. The objective is to make the process of visiting a gym/fitness center for a few days painless for both users and gym/fitness center operators and staff.

In each of the following described embodiments of the invention, the user must first download the mobile application onto their smart electronic device. Typically, this is done through the App Store on a smartphone, electronic tablet or other portable smart electronic device. Once the user downloads the mobile application, the user is instructed to register by providing the user's name, contact information and credit card information. Once registered, the user is able to view nearby gyms/fitness centers near the user's current location displayed on a map on the user's smart electronic device. The participating gyms/fitness centers registered with the mobile application are displayed on the map. In a preferred embodiment, the map page is the home page of the mobile application and is displayed immediately after registration. The user's current location is displayed on the map along with pins for the nearby participating gyms/fitness centers. The name of the gym/fitness center is displayed below or adjacent to the pin. By touching the pin on the display of the user's smart electronic device, the profile page of the selected gym/fitness center is presented to the user. This gym profile page will show such things as the types of fitness machines and other amenities available at the selected gym/fitness center. The gym profile page also presents the type of services or activities offered at particular fitness centers, such as spinning classes, pilates, boxing, yoga, etc. The selected gym/fitness center page will also present offers for time-based memberships and display the rates for the membership passes for the time-based memberships. For example, the selected gym/fitness center may offer a one day pass, a two day pass, a three day pass, a seven day pass, or a monthly pass. The rates for each time-based pass is also displayed. The mobile application provides other features such as displaying all newly purchased membership passes at the gyms/fitness centers that have been purchased by the app user. This will include the name of the gym/fitness center, the pass duration, the date of purchase, the ability to cancel the active pass and the ability to pull up a pass history page. A pass history page displays all previously purchased time-based membership passes that have been purchased by the user. For each pass, the display will indicate the name of the gym/fitness center, the number of days for the time-based membership pass that was previously purchased, the date of purchase and the total amount for the one or more purchased membership passes.

Referring to FIG. 1, one embodiment of the invention is shown.

App User:

The app user downloads the application from the store, sets up his account and is able to see the offer listings from all the nearby gyms. The app user selects the offer and pays for it via online payment. This time-based membership will now be added to the list of valid memberships of the user and a specific QR code will be generated against it.

Electronic Validation Process:

The app user walks in the gym to active his membership. The app user goes to the valid memberships list in the application, selects the time-based membership he wants to avail and shows the QR code. A gym representative will scan the QR code (presented on the screen of user app) from the Gym Scanner Mobile Application. If validated, a success message will be shown on both ends (gym and user) and user can proceed to the gym to use the facilities under membership.

Manual Check-In:

In case the user doesn't bring his cellphone, he can provide his phone number/user ID to gym staff, they can look up his valid memberships and validate. Manual check-in option can be provided via web portal and/or scanning application.

Figure 2:
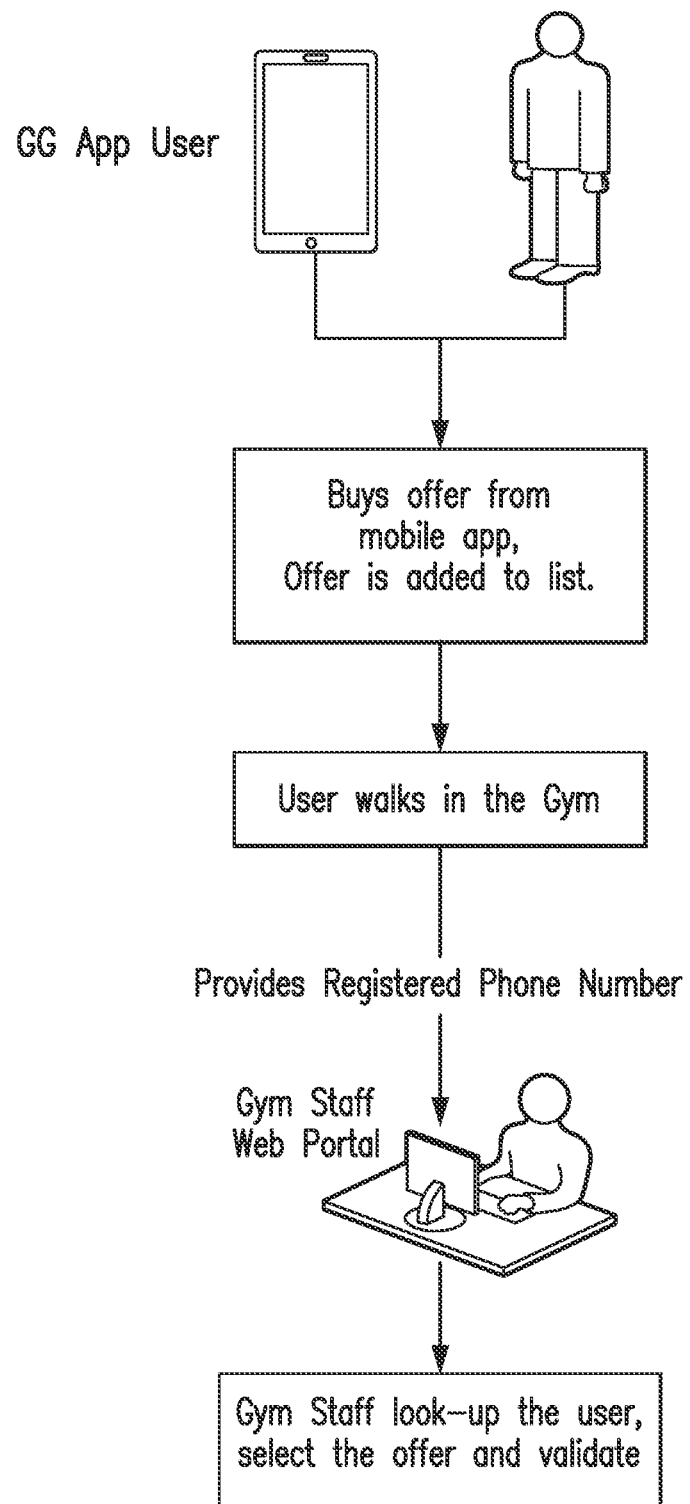
FIG. 2 is a schematic diagram illustrating an on-the-fly validation and check-in process in accordance with another embodiment of the present invention.

Referring to FIG. 2, a second embodiment of the invention is shown.

App User:

The app user downloads the application from the store, sets up his account and is able to see the offer listings from all the nearby gyms. The app user selects the offer and pays for it via online payment. This time-based membership will now be added to the list of valid memberships of the user and a multiple digit unique identifier (e.g., the app user's cellphone number) is generated against it.

Electronic Validation Process:

The app user walks in the gym to activate his membership. The app user goes to the gym staff and provides his phone number or multi-digit-unique-offer-identifier to the gym representative who enters this information in the gym web portal. Once this is done, all the relevant details will show up and the gym representative can validate the user and activate the membership.

Manual Check-In:

In case the user doesn't bring his cellphone, he can provide his phone number/user ID to gym staff, they can look up his valid memberships and validate and activate the time-based membership. Manual check-in option can be provided via web portal and/or scanning application.

Figure 3:
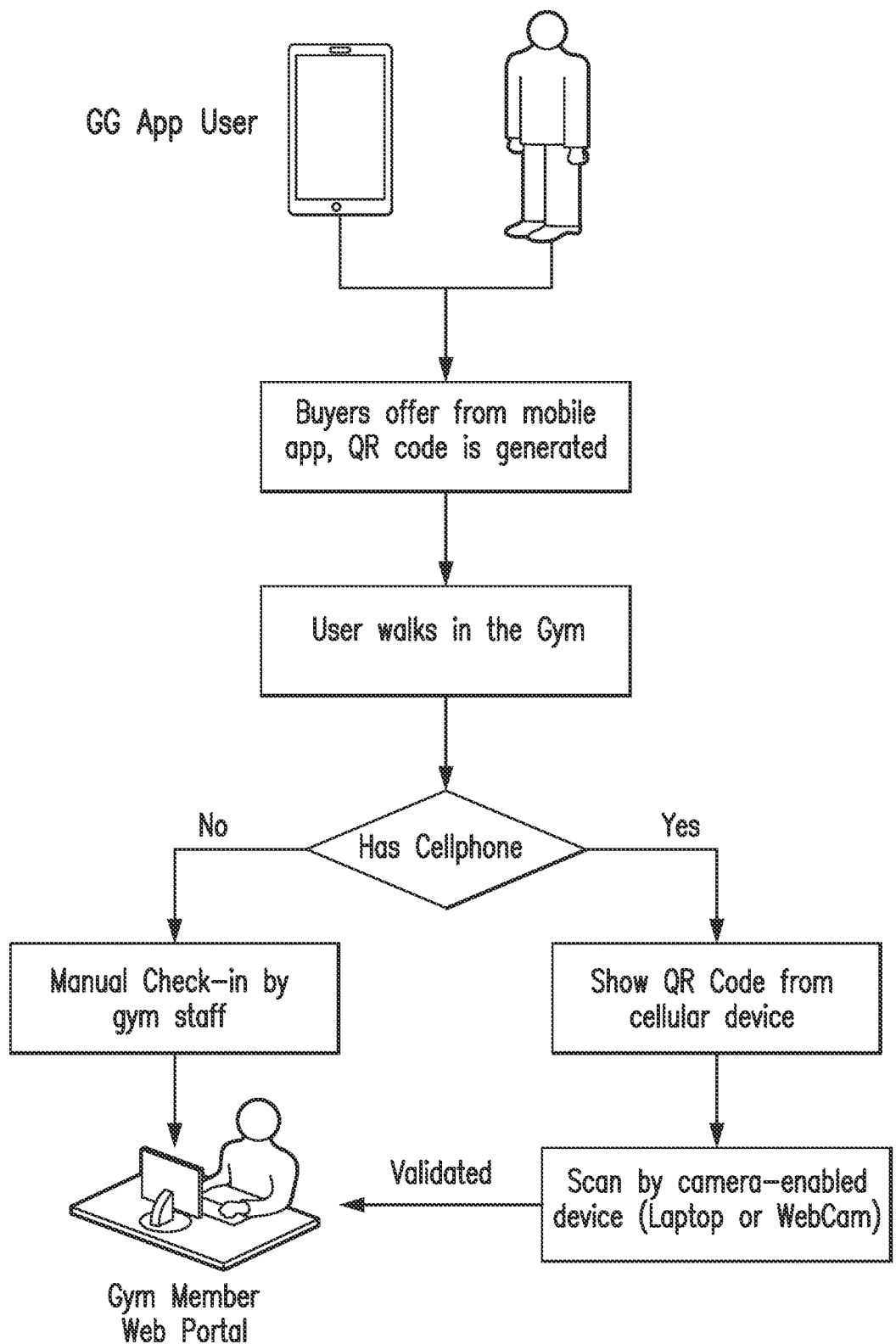
FIG. 3 is a schematic diagram illustrating an all-in-web check-in and validation process according to a further embodiment of the present invention.

Referring to FIG. 3, a third embodiment of the invention is shown.

App User:

The app user downloads the application from the store, sets up his account and is able to see the offer listings from all the nearby gyms. The app user selects the offer and pays for it via online payment. This time-based membership will now be added to the list of valid memberships of the user and a specific QR code will be generated against it.

Electronic Validation Process:

The app user walks in the gym to activate his membership. The app user goes to the valid memberships list in the application, selects the time-based membership he wants to avail and shows the QR code to a gym representative who will scan the QR code by a camera-enabled device (either laptop or webcam). If validated, a success message will be shown on both ends (gym and user) and user can proceed to gym to use the facilities under the membership.

Manual Check-In:

In case the user doesn't bring his cellphone, he can provide his phone number/user ID to gym staff, they can look up his valid memberships and validate. Manual check-in option can be provided via web portal and/or scanning application.

Figure 4:
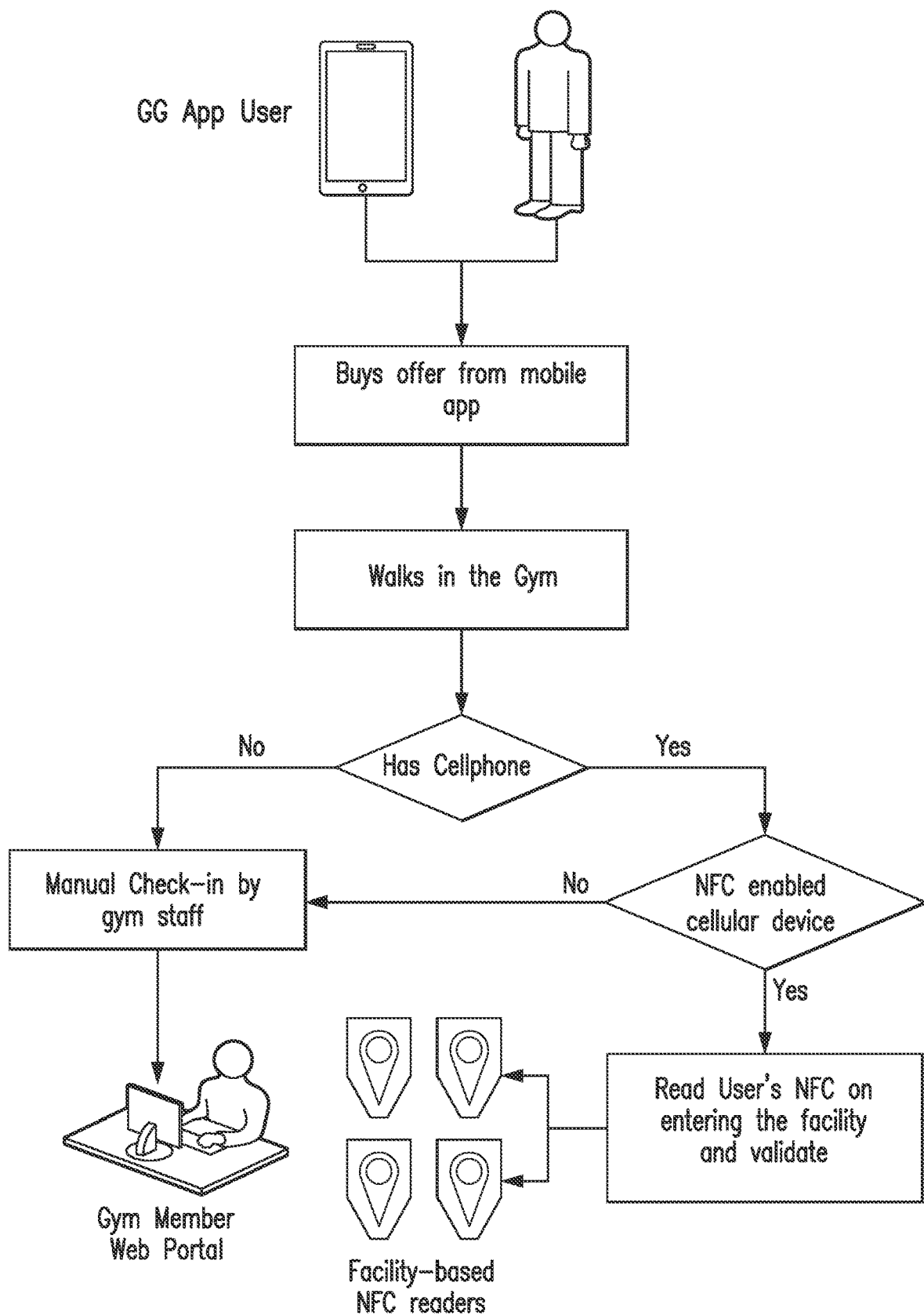
FIG. 4 is a schematic diagram of a user check-in and validation process using NFC (Near Field Communication) readers in accordance with yet a further embodiment of the present invention.

Referring to FIG. 4, a fourth embodiment of the invention is shown.

App User:

The app user downloads the application from the store, sets up his account and is able to see the offer listings from all the nearby gyms. The app user selects the offer and pays for it via online payment. This time-based membership will now be added to the list of valid memberships of the user. Every user will be assigned a unique NFC code which will uniquely identify the user.

Electronic Validation Process:

The app user walks in the gym to activate his membership. The app user enters the gym premises with his NFC-enabled phone and walks to the area of facility he wants to avail. Gym should have an NFC detector on each facility area which will detect that user has entered this area which means he has availed the offer and activated his time-based membership. The app user and gym both will be notified of the event.

Manual Check-In:

In case the user doesn't bring his cellphone, he can provide his phone number/user ID to gym staff, they can look up his valid memberships and validate. Manual check-in option can be provided via web portal and/or scanning application.

Figure 5:
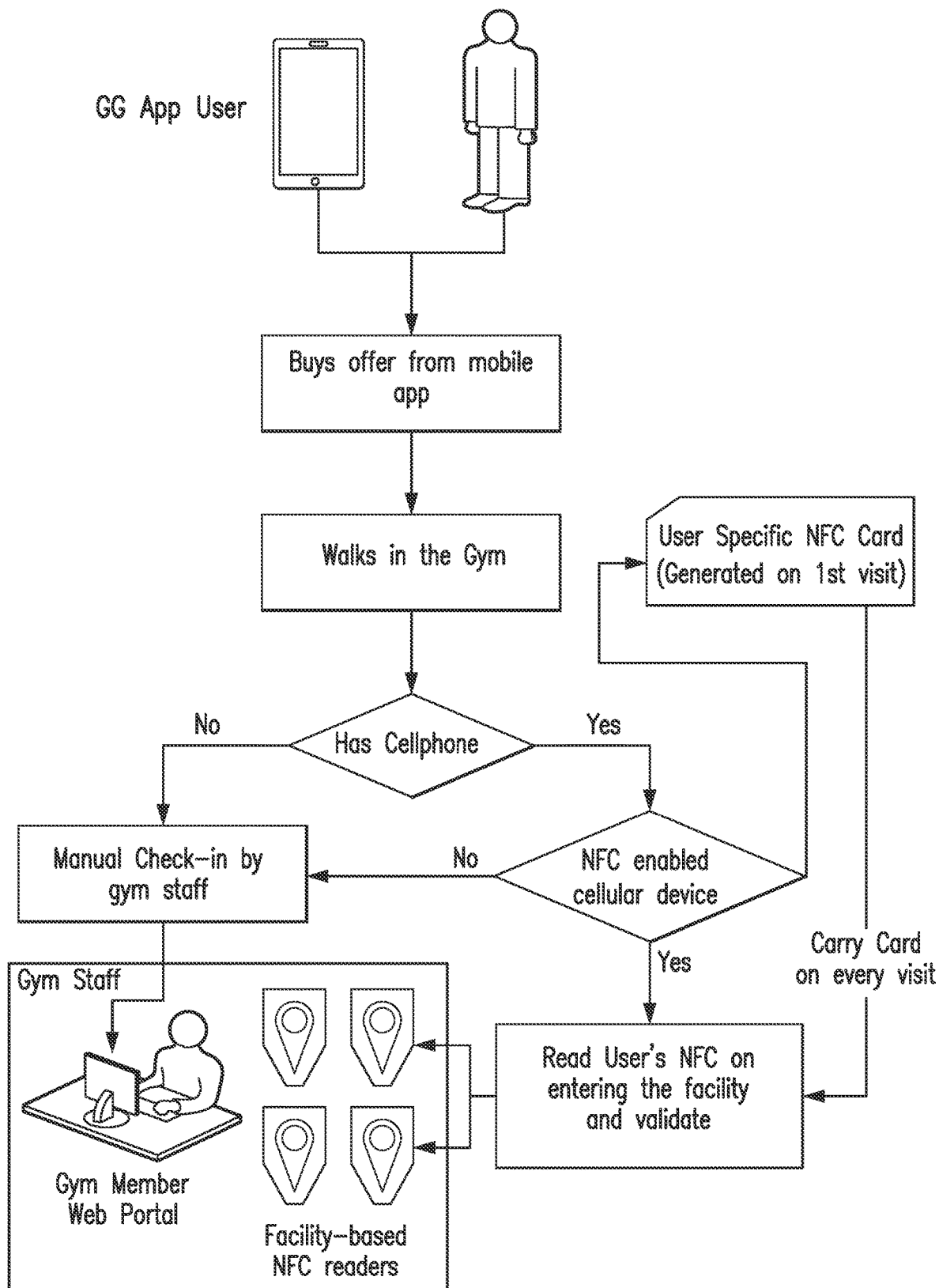
FIG. 5 is a schematic diagram illustrating an alternative system of the embodiment of FIG. 4 wherein a user that does not have an NFC-enabled cellular device is provided with an NFC embedded chip on a card that acts as an NFC-enabled device for subsequent visits to the gym.

Referring to FIG. 5, if a user doesn't have an NFC-enabled cellular device, he can be provided the NFC embedded chip on his 1st visit to any gym. The gym will map the user's user-ID on the NFC chip and that card will act as an NFC-enabled device on his subsequent visits to any gym.

Figure 6:
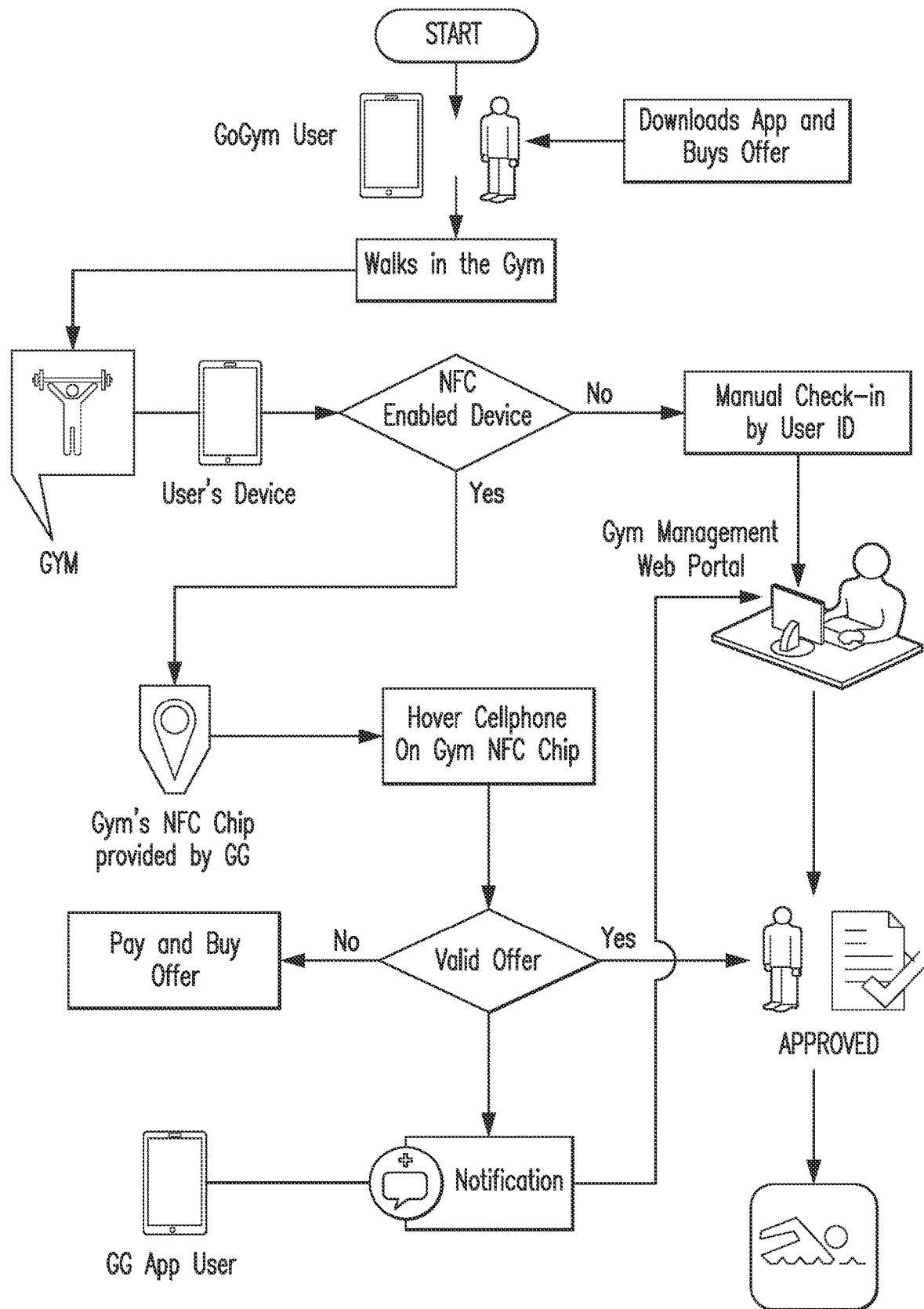
FIG. 6 is a schematic diagram illustrating a preferred embodiment of the system and method of the present invention wherein the user downloads the mobile application to their smart electronic device and thereafter is able to search for and select one or more fitness centers in the user's geographic area and to purchase time-based membership passes at selected fitness centers, and further wherein the user therein is able to check-in to a fitness center/gym where a time-based membership has been purchased and activate the time-based membership, either with an NFC enabled device or through manual check-in by user ID.

Referring to FIG. 6, a preferred embodiment of the system and method of the present invention is represented in the schematic diagram. The membership purchase process begins by the user downloading the mobile computer application onto the user's smart electronic device. The user registers with the mobile computer application providing all pertinent information including the user's name and credit card information, and once completed, an account is assigned to the user. (It should be noted that in each of the previously described embodiments, a user account is assigned to the user upon downloading the mobile computer application and completing the registration process). Once the user has registered, the application is available for use on the user's smart electronic device. The user can then search for a fitness center in the user's geographical location, or other geographic location that the user may be traveling to. The user is then presented with the participating fitness centers viewable on a map on the user's smart electronic device. The user can then select any one or more of the presented participating fitness centers and view the facilities that are available. The user can then select a time-based membership offer from any one or more of the participating fitness centers within the defined geographical area. At the time of purchasing a time-based membership from any one or more of the participating fitness centers, the user may be required to agree to terms of agreement of the particular fitness center and can then purchase the time-based membership from the fitness center through the mobile computer application. It should be noted that fitness centers have the ability and must upload their respective terms of agreement onto their profile from their respective back-end computer applications associated with the mobile computer application. The purchased time-based membership is not activated until the user checks-in to the selected fitness center using the mobile computer application on the smart electronic device.

The membership activation process is achieved when the user enters the fitness center for the first time. The user may be required to approach a check-in desk or other location for check-in at the fitness center and, at that check-in desk or other location, the user scans an NFC tag at the check-in desk or other location using the user's NFC enabled smart electronic device. To scan the NFC tag that is located in the fitness center, the user hovers their smart electronic device over the NFC tag to thereby activate the purchased time-based membership at that fitness center. It should be noted that NFC must be enabled on the user's smart electronic device prior to scanning over the NFC tag at the fitness center. Once the user has scanned their NFC enabled mobile electronic device over the NFC tag, a membership activation window is queued on the user's smart electronic device. The user taps activation confirmation on the display of their smart electronic device and the purchased time-based membership is activated and all payments are queued. The user is then able to proceed to use the available facilities in the fitness center under the purchased time-based membership.

Upon subsequent visits to the same fitness center, the user walks into the fitness center, hovers their NFC enabled smart electronic device over the NFC tag and the already activated membership logs the check-in to the fitness center's back-end computer program associated with the mobile computer application. The user then is permitted access to the fitness center to use the facilities under the purchased time-based membership.

Upon entering the fitness center for the first time, if the user has not previously purchased the time-based membership for that fitness center, then upon hovering the user's NFC enabled smart electronic device over the fitness center's NFC chip, the user will be presented with time-based membership offers for purchase at that fitness center. These presented time-based membership offers are presented via the mobile computer application on the display of the user's smart electronic device. The user can then select the desired time-based membership offer and complete the purchase by tapping on the desired time-based membership offer. The user may be presented with the fitness center's terms of agreement and be required to accept the terms of agreement to complete the purchase. Once accepting the terms of agreement, the purchase of the selected time-based membership will be completed and the appropriate cost will be charged to the user's account under the mobile computer application.

While the present invention has been shown in accordance with several preferred and practical embodiments, it is recognized that departures from the instant disclosure are fully contemplated within the spirit and scope of the present invention which is not to be limited except as defined in the following claims as interpreted under the Doctrine of Equivalents.

What is claimed is:

1. A method for allowing access to fitness centers comprising:
    establishing a mobile computer application for use on a user's smart electronic device;
    allowing the user to download the mobile computer application for storage, access and use on the user's smart electronic device and registering the user to establish a user account;
    enabling individual and non-affiliated fitness centers to present time-based membership offers on the mobile computer application that are unique to each individual and non-affiliated fitness center and valid only at the individual and non-affiliated fitness center, thereby defining participating individual and non-affiliated fitness centers;
    presenting the user with the identification of all of the participating individual and non-affiliated fitness centers available for access and use to the user;
    allowing the user to view the presented participating individual and non-affiliated fitness centers available for access and use to the user;
    presenting to the user the time-based membership offers of the participating individual and non-affiliated fitness centers;
    allowing the user to purchase one or more time-based memberships from any one or more of the participating individual and non-affiliated fitness centers;
    storing the one or more purchased time-based memberships on the mobile computer application residing on the user's smart electronic device;
    activating one particular purchased time-based membership when the user enters the individual fitness center associated with the one particular purchased time-based membership;
    validating the one particular purchased time-based membership at the individual fitness center each time the user enters the individual fitness center associated with the one particular purchased time-based membership throughout the duration of the purchased time-based membership; and
    allowing the user access to use of facilities in the individual fitness center available under the one particular purchased time-based membership throughout the duration of the purchased time-based membership starting on the date of activation; and
    presenting all time-based memberships purchased by the user on the mobile computer application, and displaying a list of all purchased time-based memberships that are still valid, including any purchased time-based memberships that have not been activated and also all purchased time-based memberships that have been activated including the time remaining on each of the purchased, valid and activated time-based memberships.

2. The method as recited in claim 1 wherein the one particular purchased time-based membership is individually and selectively activated by an electronic validation process when the user enters the selected fitness center associated with the one particular purchased time-based membership.

3. The method as recited in claim 2 wherein the electronic validation process includes the steps of:
    assigning a unique Near Field Communication (NFC) code to uniquely identify the user;
    associating the NFC code assigned to the user with the user account on the mobile computer application residing on the user's smart electronic device;
    establishing an NFC enabled device for use by the user, wherein the NFC enabled device recognizes the unique NFC code assigned to the user and stored in the mobile computer application residing on the user's portable smart electronic device;
    detecting the NFC enabled device at the selected fitness center upon the user entering the selected fitness center;
    identifying the user's unique NFC code; and
    activating the user's time-based membership.

4. The method as recited in claim 3 further comprising the step of:
    identifying the user's unique NFC code upon each subsequent return of the user to the selected fitness center throughout the term of the purchased time-based membership.

5. The method as recited in claim 3 wherein the NFC enabled device is the user's smart electronic device, and the NFC code is determined upon the user moving the user's smart electronic device over an NFC detector at the fitness center.

6. The method as recited in claim 2 wherein the electronic validation process includes the steps of:
    generating a QR code unique to the user and assigning the QR code to the user's account on the mobile computer application;
    scanning the QR code at the selected fitness center upon the user entering the selected fitness center and reading the QR code that is unique to the user and thereby identifying the user's account; and activating the user's time-based membership.

7. The method as recited in claim 6 further comprising the step of:

reading the user's QR code that is presented on the user's smart electronic device and reading the QR code to identify the user's account and permitting access to the fitness center facilities upon each subsequent return of the user to the selected fitness center throughout the term of the purchased time-based membership.

* * * * *